US012758806B2

(12) United States Patent
Wang et al.

(10) Patent No.: US 12,758,806 B2
(45) Date of Patent: Oct. 13, 2026

(54) SLIDE INSTALL RESPIRATOR CARTRIDGES AND RESPIRATORS

(71) Applicant: PIP Manufacturing, Inc., Latham, NY (US)

(72) Inventors: Siwei Wang, Latham, NY (US); Xiaojin Han, Latham, NY (US); Hongbing Xiang, Latham, NY (US); Sheng Zhou, Latham, NY (US); Anker Chen, Latham, NY (US)

(73) Assignee: PIP Manufacturing, Inc., Latham, NY (US)

( * ) Notice: Subject to any disclaimer, the term of this patent is extended or adjusted under 35 U.S.C. 154(b) by 263 days.

(21) Appl. No.: 18/466,485

(22) Filed: Sep. 13, 2023

(65) Prior Publication Data

US 2024/0091569 A1 Mar. 21, 2024

(30) Foreign Application Priority Data

Sep. 20, 2022 (CN) ......................... 202211144398.7

(51) Int. Cl.
*B01D 46/58* (2022.01)
*A62B 7/10* (2006.01)
(Continued)

(52) U.S. Cl.
CPC .................. *A62B 7/10* (2013.01); *A62B 9/00* (2013.01); *A62B 18/006* (2013.01); *A62B 23/02* (2013.01);
(Continued)

(58) Field of Classification Search
CPC ........... A62B 18/00; A62B 23/02; A62B 7/10; A62B 9/00; B01D 46/00; B01D 46/58
See application file for complete search history.

(56) References Cited

U.S. PATENT DOCUMENTS 7,469,699 B2 12/2008 Gossweiler
10,888,721 B2 * 1/2021 Hur ........................ A62B 19/00
(Continued)

FOREIGN PATENT DOCUMENTS

CN 210020900 U 2/2020
CN 216439846 U 5/2022
(Continued)

OTHER PUBLICATIONS

English Translation of JP Office Action dated Sep. 12, 2024 for JP Application No. 2023149139, 3 page(s).
(Continued)

*Primary Examiner* — Sharon Pregler
(74) *Attorney, Agent, or Firm* — Fredrikson & Byron, P.A.

(57) ABSTRACT

Methods, apparatuses, systems, and/or the like are provided. An example method may include installing one or more filter cartridges in a blower device. An example blower device may include a housing defining at least one air inlet. An example filter cartridge may include a first filter cartridge defining a first outlet opening. The first filter cartridge may be configured to slidably engage the blower device to align the first outlet opening with at least a first portion of the at least one air inlet of the blower device in a first installed position. The one or more filter cartridges my include a second filter cartridge. The second filter cartridge may include a second outlet opening. The example method may include aligning the first outlet opening of the first filter cartridge with at least the first portion of the at least one air inlet of the blower device.

15 Claims, 9 Drawing Sheets

(51) Int. Cl.

| | |
|---|---|
| ***A62B 9/00*** | (2006.01) |
| ***A62B 18/00*** | (2006.01) |
| ***A62B 23/02*** | (2006.01) |
| ***B01D 46/00*** | (2022.01) |

(52) U.S. Cl.
CPC ......... *B01D 46/0005* (2013.01); *B01D 46/58* (2022.01); *B01D 2265/024* (2013.01); *B01D 2279/40* (2013.01)

(56) References Cited

U.S. PATENT DOCUMENTS

| | | | |
|---|---|---|---|
| 2003/0154983 | A1 | 8/2003 | Marx |
| 2004/0173097 | A1 | 9/2004 | Engelland et al. |
| 2006/0048782 | A1 | 3/2006 | Gossweiler |
| 2006/0237013 | A1 | 10/2006 | Kwok |
| 2007/0277827 | A1 | 12/2007 | Bordewick et al. |
| 2008/0216455 | A1 | 9/2008 | Aizawa et al. |
| 2015/0136142 | A1 | 5/2015 | Blomberg |

FOREIGN PATENT DOCUMENTS

| | | | |
|---|---|---|---|
| GB | 2601140 | A | 6/2022 |
| JP | 2006-517637 | A | 7/2006 |
| JP | 2007-506482 | A | 3/2007 |
| JP | 2008-223485 | A | 9/2008 |
| JP | 2009-533153 | A | 9/2009 |
| JP | 2013-150684 | A | 8/2013 |
| JP | 2016-538047 | A | 12/2016 |
| WO | 2014/120502 | A2 | 8/2014 |

OTHER PUBLICATIONS

JP Office Action Mailed on Sep. 12, 2024 for JP Application No. 2023149139, 3 page(s).
Extended European Search Report Mailed on Feb. 19, 2024 for EP Application No. 23194789, 11 page(s).
English Translation of JP Office Action dated Dec. 24, 2024 for JP Application No. 2023149139, 2 page(s).
JP Office Action Mailed on Dec. 24, 2024 for JP Application No. 2023149139, 2 page(s).

* cited by examiner

SLIDE INSTALL RESPIRATOR CARTRIDGES AND RESPIRATORS

CROSS-REFERENCE TO RELATED APPLICATIONS

This application claims priority pursuant to 35 U.S.C. 119(a) to Chinese Application No. 202211144398.7, filed Sep. 20, 2022, which application is incorporated herein by reference in its entirety.

TECHNICAL FIELD

The present disclosure relates generally to air purifying respirators. In particular, it relates to various filter cartridges, blower devices, systems, and the use and/or installation of one or more cartridges onto a blower device.

BACKGROUND

In certain environments, such as industrial workplaces, there is a risk of inhaling and other exposure to harmful substances and airborne contaminants. The use of respirators, such as powered air-purifying respirators (PAPR) and air-purifying respirators (APR), can be essential for ensuring safety in certain conditions. However, it may sometimes be complicated and/or difficult to install filter cartridges in an APR or PAPR. Additionally, methods for installing an APR or PAPR cartridge may not provide proper, accurate, or precise sealing.

Through applied effort, ingenuity, and innovation, Applicant has solved problems relating to the aforementioned difficulties and others by developing solutions embodied in the present disclosure, which are described in detail below.

SUMMARY

In general, aspects of the present disclosure provide methods, apparatuses, systems, computing devices, computing entities, and/or the like.

Various embodiments of the present disclosure may include a respirator system. In some embodiments, the system may include a blower device. In some embodiments, the blower device includes a housing defining at least one air inlet. In some embodiments, the system includes a first filter cartridge defining a first outlet opening. In some embodiments, the first filter cartridge is configured to slidingly engage the blower device to align the first outlet opening with at least a first portion of the at least one air inlet of the blower device in a first installed position. In some embodiments, the system includes a second filter cartridge defining a second outlet opening. In some embodiments, the second filter cartridge is configured to slidingly engage the blower device to align the second outlet opening with at least a second portion of the at least one air inlet of the blower device in a second installed position.

In some embodiments, the blower device includes a first stopper structure. In some embodiments, the first stopper structure is disposed on a first side of the housing. In some embodiments, the blower device includes a second stopper structure. In some embodiments, the second stopper structure is disposed on a second side of the housing opposite the first side of the housing. In some embodiments, the first stopper structure is configured to operably engage the first filter cartridge to retain the first filter cartridge in the first installed position. In some embodiments, the second stopper structure is configured to operably engage the second filter cartridge to retain the second filter cartridge in the second installed position.

In some embodiments, the first filter cartridge is configured to slide along a first direction to engage the blower device. In some embodiments, first filter cartridge includes a first mounting groove. In some embodiments, the first stopper structure is configured to slide into engagement with the first mounting groove when the first filter cartridge reaches the first installed position. In some embodiments, the second filter cartridge is configured to slide along a second direction to engage the blower device. In some embodiments, the second filter cartridge includes a second mounting groove. In some embodiments, the second stopper structure is configured to slide into engagement with the second mounting groove when the second filter cartridge reaches the second installed position.

In some embodiments, the at least one inlet of the blower device includes an inlet. In some embodiments, the first outlet opening of the first filter cartridge and the second outlet opening of the second filter cartridge are each configured to align with the inlet simultaneously.

In some embodiments, the inlet is disposed at a lateral midpoint along the housing. In some embodiments, the first outlet opening of the first filter cartridge is disposed at or proximate a first end of a first blower-device engagement surface of the first filter cartridge. In some embodiments, the second outlet opening of the second filter cartridge is disposed at or proximate a second end of a second blower-device engagement surface of the second filter cartridge.

In some embodiments, the inlet defines a sealing surface including a first portion angled at a first inlet angle towards the first filter cartridge in the first installed position. In some embodiments, the inlet defines a second portion angled at a second inlet angle towards the second filter cartridge in the second installed position. In some embodiments, the first portion is disposed at a different angle than the second portion in an instance in which the first filter cartridge and the second filter cartridge are in the installed position.

In some embodiments, the first outlet opening defines a first sealing surface. In some embodiments, the first sealing surface is configured to be disposed at a first complementary angle to the first inlet angle in the first installed position. In some embodiments, the second outlet opening defines a second sealing surface. In some embodiments, the second sealing surface is configured to be disposed at a second complementary angle to the second inlet angle in the second installed position.

In some embodiments, the housing includes a sealing beam defined across the inlet and configured to engage both the first filter cartridge in the first installed position and the second filter cartridge in the second installed position.

In some embodiments, the first filter cartridge is configured to slidingly engage the blower device by sliding in a first direction. In some embodiments, the second filter cartridge is configured to engage the blower device by sliding in a second direction opposing the first direction.

In some embodiments, the first filter cartridge is configured to contact the second filter cartridge in an instance in which the first filter cartridge is in the first installed position and the second filter cartridge is in the second installed position.

In some embodiments, on the one hand, each of the first filter cartridge and the second filter cartridge or, on the other hand, the blower device, includes at least one projection. In some embodiments, the other of, on the one hand, each of the first filter cartridge and the second filter cartridge or, on the other hand, the blower device, includes at least one sliding track. In some embodiments, the at least one projection is configured to engage one or more of the at least one sliding track to facilitate the sliding engagement of the first filter cartridge and the second filter cartridge with the blower device.

In some embodiments, the blower device includes a filter cartridge engagement surface. In some embodiments, the first filter cartridge and the second filter cartridge each include a blower device engagement surface. In some embodiments, the blower device engagement surfaces are configured to contact the filter cartridge engagement surface in an instance in which the first filter cartridge is in the first installed position and the second filter cartridge is in the second installed position.

In some embodiments, the filter cartridge engagement surface and the blower device engagement surfaces define complementary non-linear shapes.

In some embodiments, the respirator system is an air purifying respirator system (APR). In some embodiments, the respirator system is a powered air purifying respirator system (PAPR).

In some embodiments, the first filter cartridge further includes one or more pieces of elastomeric material. In some embodiments, the one or more pieces of elastomeric material are configured to seal against the housing of the blower device.

Various embodiments of the present disclosure may include a filter cartridge. In some embodiments, the filter cartridge may include an outlet opening. In some embodiments, the outlet opening is disposed at or proximate a first end of a blower device engagement surface of the filter cartridge. In some embodiments, at least one projection or at least one sliding track is configured to slidingly engage a blower device. In some embodiments, the outlet opening of the filter cartridge is configured to move in a sliding direction to slidingly engage the blower device along a sliding direction. In some embodiments, the outlet opening defines a sealing surface configured to be disposed at a first sealing surface angle that is oblique to the sliding direction.

In some embodiments, the filter cartridge includes a mounting groove defined at the blower device engagement surface of the filter cartridge. In some embodiments, the mounting groove is configured to engage a stopper structure of the blower device.

Various embodiments of the present disclosure may include a method of installing filter cartridges in a blower device. In some embodiments, the blower device includes a housing defining at least one air inlet. In some embodiments, the filter cartridges includes a first filter cartridge defining a first outlet opening. In some embodiments, the first filter cartridge is configured to slidingly engage the blower device to align the first outlet opening with at least a first portion of the at least one air inlet of the blower device in a first installed position. In some embodiments, the filter cartridges include a second filter cartridge defining a second outlet opening. In some embodiments, the second filter cartridge is configured to slidingly engage the blower device to align the second outlet opening with at least a second portion of the at least one air inlet of the blower device in a second installed position. In some embodiments, the method includes aligning the first outlet opening of the first filter cartridge with at least the first portion of the at least one air inlet of the blower device. In some embodiments, the method includes aligning the second outlet opening of the second filter cartridge with at least the second portion of the at least one air inlet of the blower device.

In some embodiments, the aligning of the first outlet opening of the first filter device with the at least the first portion of the at least one air inlet of the blower device includes operably engaging a first stopper structure disposed on a first side of the housing with the first filter cartridge. In some embodiments, the aligning the second outlet opening of the second filter device with the at least the second portion of the at least one air inlet of the blower device includes operably engaging a second stopper structure disposed on a second side of the housing with the second filter cartridge. In some embodiments, the second side of the housing is opposite the first side of the housing.

In some embodiments, the aligning the first outlet opening of the first filter device with the at least the first portion of the at least one air inlet of the blower device includes sliding the first filter cartridge along a first direction to engage a first mounting groove of the first filter cartridge with the first stopper structure. In some embodiments, the aligning the second outlet opening of the second filter cartridge with at least the second portion of the at least one air inlet of the blower device includes sliding the second filter cartridge along a second direction, opposite the first direction, to engage a second mounting groove of the second filter cartridge with the second stopper structure.

The above summary is provided merely for purposes of summarizing some example aspects to provide a basic understanding of some aspects of the disclosure. Accordingly, it will be appreciated that the above-described aspects are merely examples. It will be appreciated that the scope of the disclosure encompasses many potential aspects in addition to those here summarized, some of which will be further described below.

BRIEF DESCRIPTION OF THE SEVERAL VIEWS OF THE DRAWING(S)

Having thus described the disclosure in general terms, reference will now be made to the accompanying drawings, which are not necessarily drawn to scale, and wherein:

Figure 8:
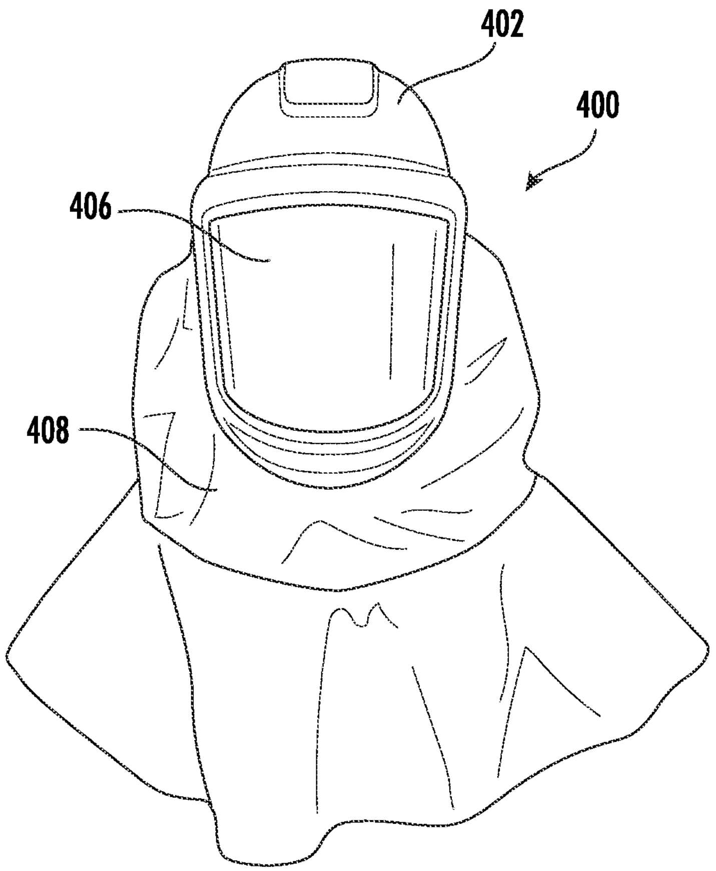
Figure 9:
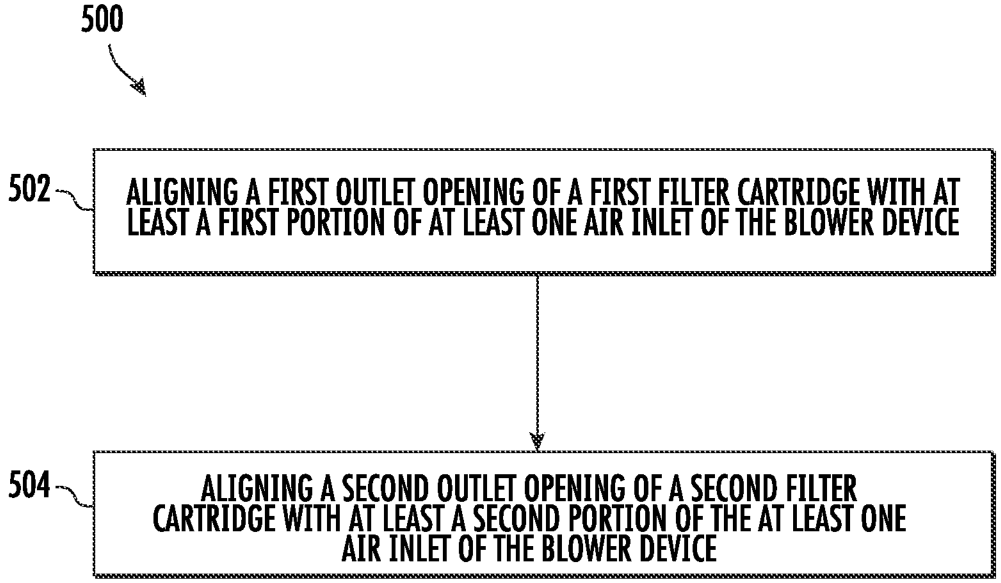

FIG. 8 a front view of an example headgear utilizing an example respirator system in accordance with various embodiments of the present disclosure; and FIG. 9 is a flow diagram of an example method for installing a filter cartridge in accordance with various embodiments of the present disclosure.

DETAILED DESCRIPTION OF SOME EXAMPLE ASPECTS

Various embodiments of the present disclosure now will be described more fully hereinafter with reference to the accompanying drawings, in which some, but not all embodiments of the disclosure are shown. Indeed, this disclosure may be embodied in many different forms and should not be construed as limited to the embodiments set forth herein; rather, these aspects are provided so that this disclosure will satisfy applicable legal requirements. The term "or" (also designated as "/") is used herein in both the alternative and conjunctive sense, unless otherwise indicated. The terms "illustrative" and "exemplary" are used to be examples with no indication of quality level. Like numbers may refer to like elements throughout. The phrases "in one embodiment," "according to one embodiment," and/or the like generally mean that the particular feature, structure, or characteristic following the phrase may be included in at least one aspect of the present disclosure and may be included in more than one aspect of the present disclosure (importantly, such phrases do not necessarily may refer to the same aspect).

Overview

Various embodiments of the present disclosure are described herein with reference to the accompanying drawings. Various embodiments may include respirator systems, blower devices, filter cartridges, and associated methods. In some embodiments, a respirator may be provided that facilitates the speedy, precise, accurate, and ergonomic attachment and un-attachment of example cartridges with example blower devices.

In various embodiments, a blower device may have a housing with at least one inlet and at least one outlet to respectively draw in and expel air. The blower device may direct air to a user via wearable headgear connected to the blower device. The blower device may engage one or more filter cartridges to filter air flowing through the blower device prior to reaching the wearer, such that airborne hazards are removed from the air. In some embodiments, one or more filter cartridges may engage the blower device upstream of the inlet.

Various embodiments of the present disclosure include a plurality of filter cartridges configured to slidingly engage the blower device for intuitive installation. In some embodiments, the at least one inlet of the blower device may be at a lateral midpoint of the blower device such that two filter cartridges, slid into engagement with the blower device from opposite sides, may meet at the midpoint and each may at least partially cover a respective portion of the at least one inlet. In some embodiments, the at least one inlet may be a single inlet configured to couple with outlets on each of the filter cartridges or the at least one inlet may be multiple inlets configured to respectively engage with one or more of the filter cartridges.

Various embodiments of the present disclosure relate to one or more filter cartridges that include angled outlet surfaces configured to accurately and precisely mate with a corresponding angled sealing surface on the at least one inlet of the blower device. For example, each of the outlet surfaces and inlet surface may be angled obliquely to an exterior surface of the blower device and/or a sliding direction of the filter cartridges. In some embodiments, the angled surfaces may mate to laterally align the filter cartridge and create a seal as the filter cartridge is inserted. In some embodiments, two filter cartridges may be used, each with angled outlets, which may be inserted from opposite lateral sides of the blower device. In some such embodiments, the at least one inlet opening may be a single inlet with two portions angled in different directions to match the outlet angles of the respective filter cartridges. In such embodiments, the filters may form an accurate, precise seal with the one or more inlets to allow repeatable alignment. In some embodiments, the one or more filters may slide relative to the blower device via respective tracks and protrusions that engage each other between the components. In some embodiments, one or more filters may slide in a groove along the body of the blower device. In some embodiments, stopper structures may be slid into engagement (e.g., spring-loaded) with respective filter cartridges to secure them to the blower device.

In various embodiments, the one or more filter cartridges may have outlets that align over the air inlet of the blower device. Some examples for engaging the one or more filter cartridges with the housing may include sliding the one or more cartridges onto the housing of the blower device. Depending on the desired configuration, the one or more filter cartridges may have either a sliding track or one or more projections, or the blower device may have a sliding track or one or more projections; in either arrangement, the projections and the sliding track may be engaged to facilitate sliding the one or more cartridges onto the blower device. The one or more cartridges may be attached to the blower device by using stopper structures disposed on the housing of the blower device to operably engage grooves on the one or more filter cartridges. In some situations, the air inlet of the blower device may define a surface that may form a seal with the one or more cartridges when the cartridges are inserted into the blower device. In various embodiments, the one or more cartridges may have a surface for configured to engage the blower device, and the blower device may have a surface configured to engage the one or more cartridges.

Blower Device Examples

Figure 1:
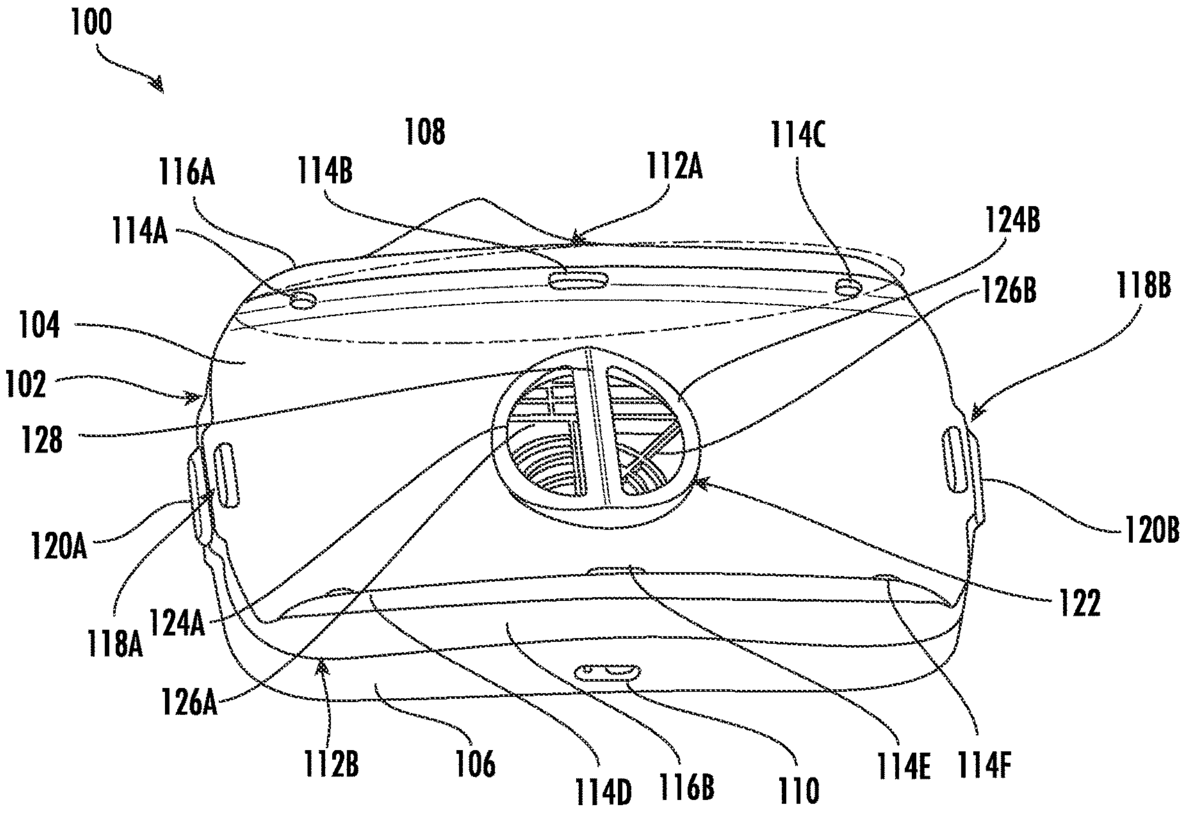
FIG. 1 is an angled view of an example blower device with an air inlet, supporting structure, and stopper structure in accordance with various embodiments of the present disclosure.

FIG. 1 is an angled view of an example blower device 100. In some embodiments, this blower device 100 may be part of an air purifying respirator (APR) or a powered air purifying respirator (PAPR). In some embodiments, the blower device 100 includes a housing 102 comprising one or more pieces. In some embodiments, the housing 102 may include a top portion 104 and a bottom portion 106. In some embodiments, the top portion 104 may define a filter-cartridge engagement surface that is configured to engage with a cartridge 200. In some embodiments, the housing 102 may include an air outlet 108 that extends from the housing 102. The air outlet 108 may be configured to couple with headgear (e.g., headgear 400 shown in FIG. 8 or any other user-worn breathing mask) via one or more hoses to deliver filtered air to the user. In some embodiments, the blower device 100 may further include one or more fans within the body to draw air from an external environment, through the one or more filter cartridges (e.g., via an inlet on the lateral end of the cartridge), into the inlet 122 of the blower device, and out the outlet 108 to the headgear (e.g., headgear 400 shown in FIG. 8). In some embodiments, the housing 102 may include at least one lower opening 110 at its bottom portion 106. In some embodiments, the at least one lower opening 110 may be a charger port (e.g., a type-c charger port).

Figure 2:
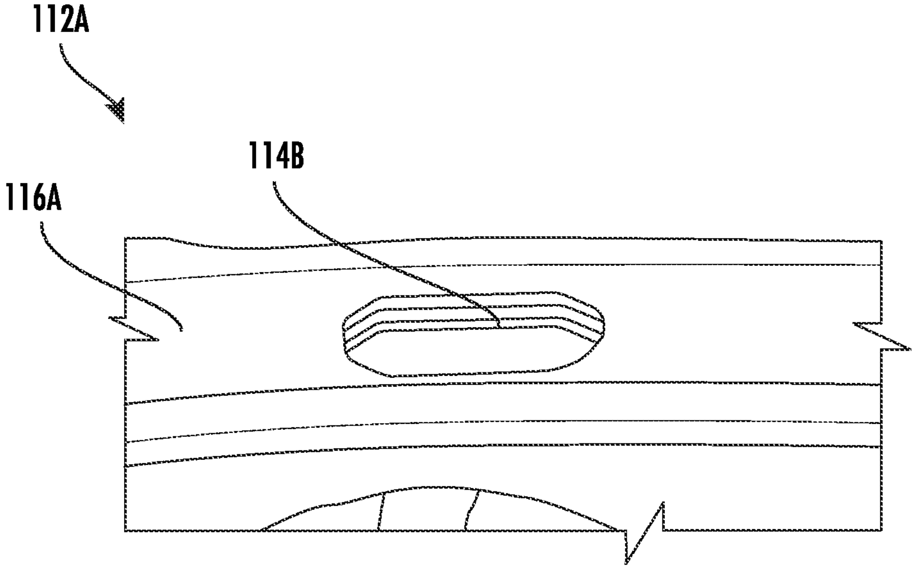
FIG. 2 is an angled view of an example supporting structure of an example blower device in accordance with various embodiments of the present disclosure.
Figure 5:
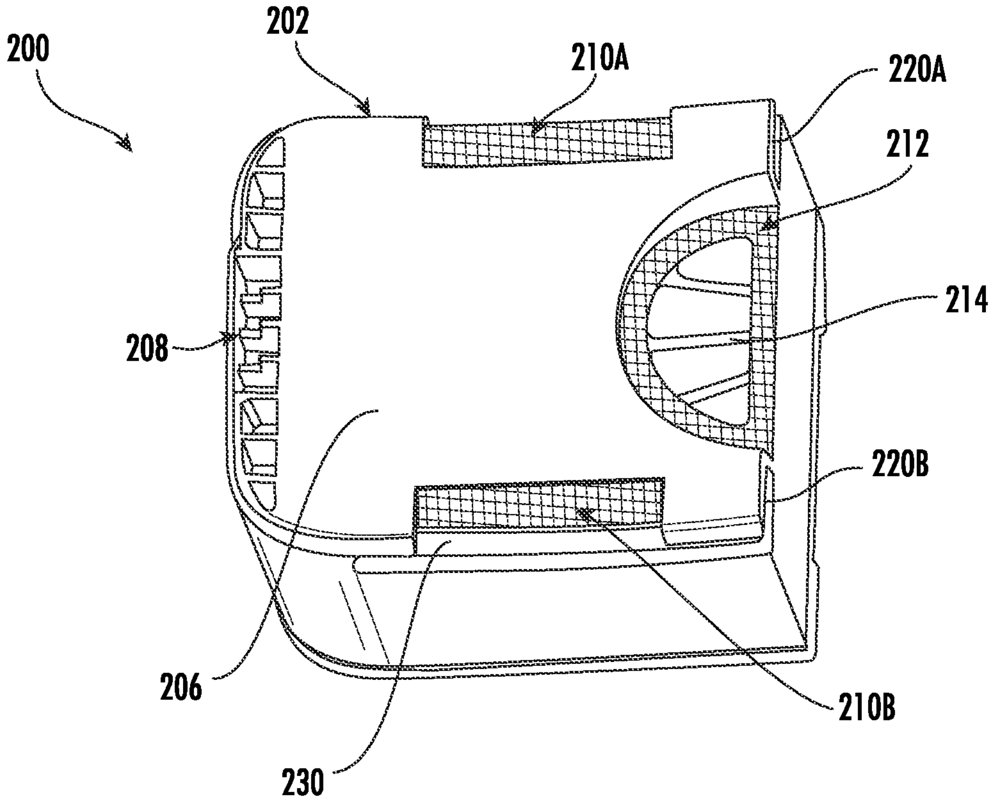
FIG. 5 is a first angled view of an example cartridge in accordance with various embodiments of the present disclosure.
Figure 6:
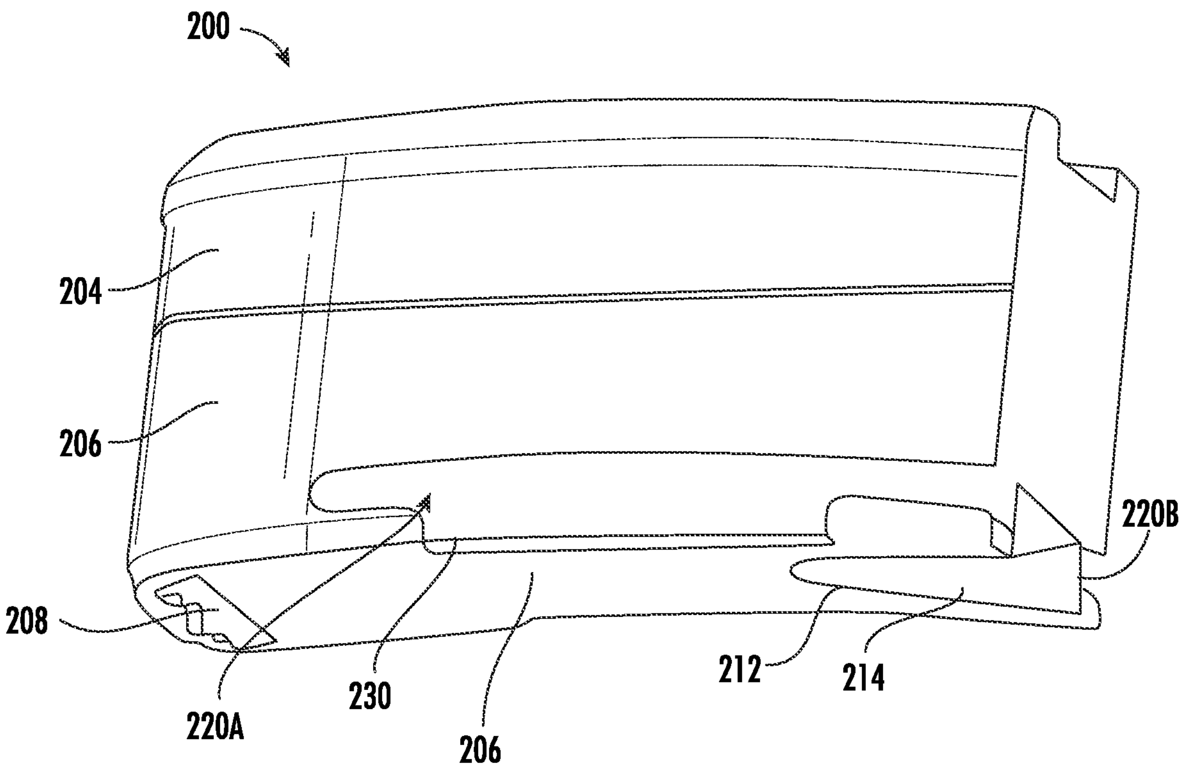
FIG. 6 is a second angled view of an example cartridge in accordance with various embodiments of the present disclosure.

According to some embodiments, and as shown in greater detail in at least FIG. 2, the housing 102 may include a plurality of supporting structures 112A and 112B, which engage the one or more filter cartridges. In some embodiments, the supporting structures 112A, 112B include a plurality of projections 114A, 114B, 114C, 114D, 114E, and 114F configured to engage the filter cartridges (e.g., via sliding tracks on the cartridges, as shown in FIGS. 5-6). It will be understood that, though three projections 114A, 114B, and 114C or 114D, 114E, and 114F are shown per supporting structure 112A, 112B, in some embodiments there may be greater or fewer than three projections 114A, 114B, 114C, 114D, 114E, 114F. In some embodiments, the filter cartridges may include one or more projections while the body of the blower device includes one or more sliding tracks to receive the projections. In some embodiments, the supporting structures 112A, 112B may include a plurality of lateral surfaces 116A, 116B, respectively, facing each other and defining a groove therebetween into which a portion of the filter cartridge(s) are configured to slide. In some embodiments, and as will be discussed in greater detail, the lateral surfaces 116A, 116B and the projections 114A-114F may be configured to be slidably attachable to the one or more cartridges 200.

Figure 3:
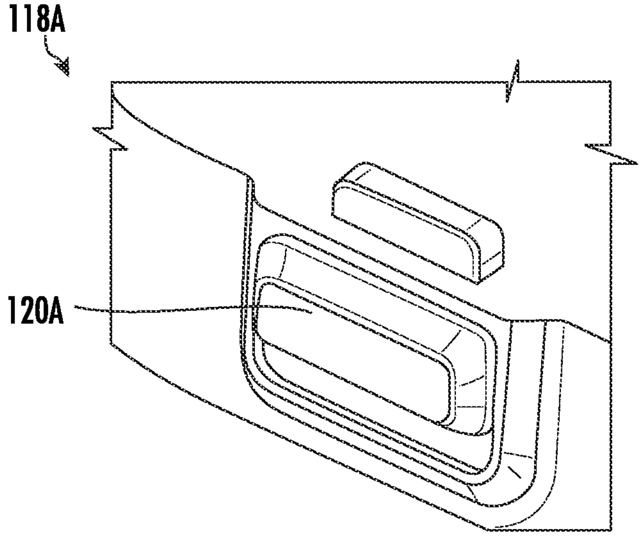
FIG. 3 is an angled view of an example stopper structure of an example blower device in accordance with various embodiments of the present disclosure.

In some embodiments, and as shown in greater detail in at least FIG. 3, a plurality of stopper structures 118A, 118B may be engaged with and slidable relative to the housing 102. Though two stopper structures 118A, 118B are shown in at least FIGS. 1 and 3, it will be understood that more stopper structures 118A, 118B or fewer stopper structures 118A, 118B may be used in various embodiments. In some embodiments, the stopper structures 118A, 118B may include one or more buttons 120A or 120B, respectively that extend at least partially from respective lateral ends of the housing 102. It will be understood that more buttons 120A, 120B may be used in some embodiments, and fewer buttons 120A, 120B may be used in other embodiments. In some embodiments, pressing on the one or more buttons 120A, 120B of the stopper structures 118A, 118B may engage the blower device 100 with one or more elements of the cartridge 200 for installation and uninstallation purposes. For example, the stopper structures 118A, 118B may be spring loaded and may have distal ends that extend outwardly from the filter-cartridge engaging surface of the blower device to laterally secure the filter cartridges in position after they are slid into an installed position.

Figure 4:
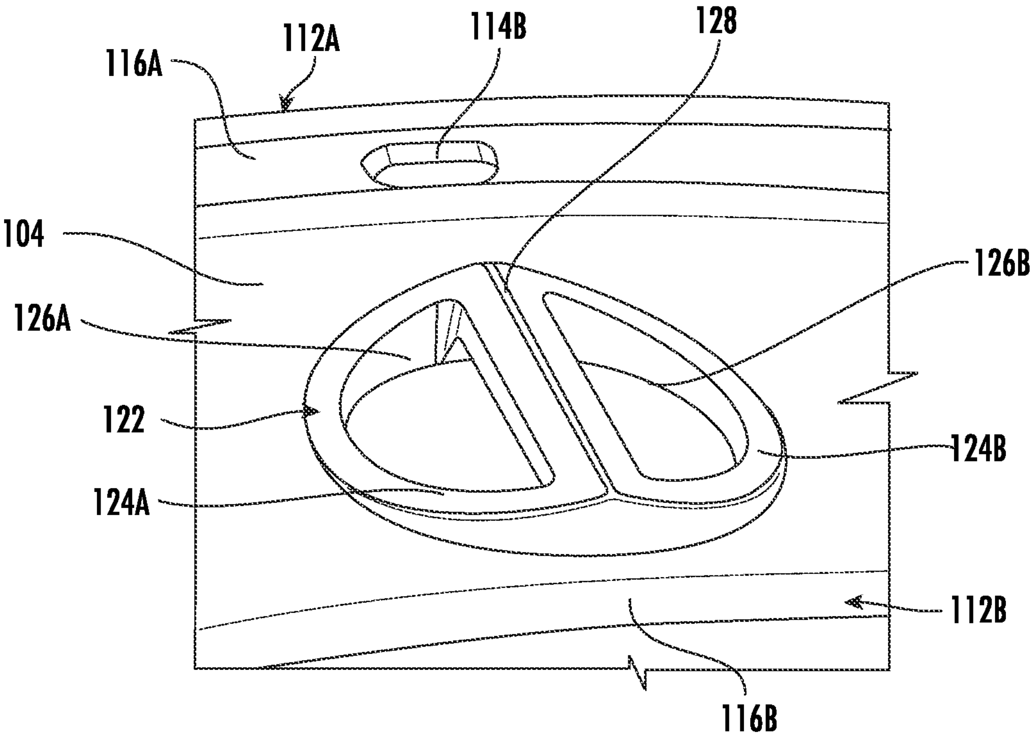
FIG. 4 is an angled view of an example air inlet for an example blower device in accordance with various embodiments of the present disclosure.

In some embodiments, and as also shown in FIG. 4, the housing 102 may include an air inlet 122. In some embodiments, the air inlet 122 may be configured to take air into the blower device 100 and thereby supply it to a user. In some embodiments, and as will be discussed in greater detail, the one or more filter cartridges 200 may be used to filter the air that passes through the air inlet 122. In some embodiments, the air inlet 122 may be disposed at a lateral midpoint along the housing 102; that is, laterally along the top portion 104 of the housing 102 at a left to right center relative to the perspective of FIG. 1. In some embodiments, the air inlet 122 may include a plurality of inclined angled surfaces 124A, 124B that are obliquely positioned relative to the adjacent filter-cartridge engaging surface of the blower device (e.g., not parallel and not perpendicular to the filter-cartridge engaging surface in some embodiments). In some embodiments, the air inlet 122 may have two halves 126A, 126B, each of which may correspond to each of the respective inclined surfaces 124A, 124B divided by a beam (e.g., the depicted beam 128 across the midpoint of the inlet). In some embodiments, the air inlet 122 may be a single, undivided air inlet 122. In some embodiments, the inclined surfaces 124A, 124B of the air inlet 122 may engage with one or more elements of one or more of the example cartridges 200, 300, as will be described in greater detail with respect to FIG. 5 or 6. In some embodiments, the housing 102 includes a sealing beam 128 that spans the air inlet 122.

Although reference has been made above to the blower device 100 being a powered device, it will be understood that, in some embodiments, the blower device 100 may be an unpowered device, with or without internal blower hardware. For example, in some embodiments, the blower device 100 may be part of any active or passive respirators, including solely face-worn respirators.

Air Filter Cartridge Examples

In some embodiments, the housing 102 of the blower device 100 may be connected to one or more example filter cartridges 200. In some embodiments, two filter cartridges 200 are installed in the housing, as will be further explained in at least FIG. 7 and the associated portions of this disclosure. In some embodiments, a single filter cartridge only may be installed in the housing 102. It will be further understood that, in some embodiments, the housing 102 may include more than two filter cartridges 200. The cartridge 200 of the example blower device 100 will be described in further detail in reference to at least FIGS. 5, 6, and 7 in this disclosure.

FIG. 5 is an angled view of a blower-device engaging surface of an example cartridge 200 that can be used in accordance with various embodiments of the present disclosure. In some embodiments, the cartridge 200 may be a filter cartridge configured to filter air supplied by the blower device 100 to a user. In some embodiments, more than one cartridge 200 may perform this filtering function. In some embodiments, the cartridge 200 may include a blower-device engagement surface 206. In some embodiments, the blower-device engagement surface 206 may be adjacent the top portion 104 of the blower device 100. In some embodiments, the cartridge 200 may include a mounting groove 208. In the depicted embodiment, the groove 208 is formed by multiple cut sections in a set of vertically-extending vanes at the lateral edge of the blower-device engagement surface 206. In some embodiments, the mounting groove 208 is configured to be engaged by the one or more distal ends of one or more of the stopper structures 118A, 118B of the blower device 100. In at least this way, in some embodiments, the mounting grooves 208 may be installed and uninstalled in the blower device 100 by means of the operable connection between the one or more stopper structures 118A, 118B and the mounting groove 208. The stopper structures 118A, 118B may be spring-loaded towards an engaged position with the filter cartridges and may translate perpendicular to the sliding direction of the cartridges (e.g., parallel to the respective lateral ends of the blower device). In some embodiments, the cartridge 200 may include elastomeric material 210A, 210B that may be connected to or integrated with the blower-device engagement surface 206 of the cartridge 200. For example, the main portions of both the blower device and the cartridges may be plastic, while the elastomeric material may be disposed on predetermined areas, such as around the inlet/outlet connections and at the identified locations on FIG. 5. In some embodiments, the elastomeric material 210A, 210B may ensure that the connection between the cartridge 200 and the blower-device engagement surface 206 has no gaps or minimal gaps. In some embodiments, this may improve the slidable connection between the cartridge 200 and the blower device (e.g., to promote smooth sliding). In some embodiments, this may reduce inadvertent and undesired shaking by the blower device after the one or more cartridges are installed. In some embodiments, the top portion 104 of the blower device 100 and the blower-device engagement surface 206 of the cartridge 200 may be at least partially complementary shapes. In some embodiments, the top portion 104 of the blower device 100 and the blower-device engagement surface 206 of the cartridge 200 may be at least partially complementary non-linear shapes. For example, the top portion 104 may be a curved surface configured to be placed adjacent to a blower-device engagement surface 206, which may also be a curved surface, according to some embodiments. In some such embodiments, the tracks 220 in which the protrusions slide may likewise be curved. Whether curved or linear, the insertion movement of the filter cartridges into engagement with the blower device may be deemed to be in a sliding direction.

Figure 7:
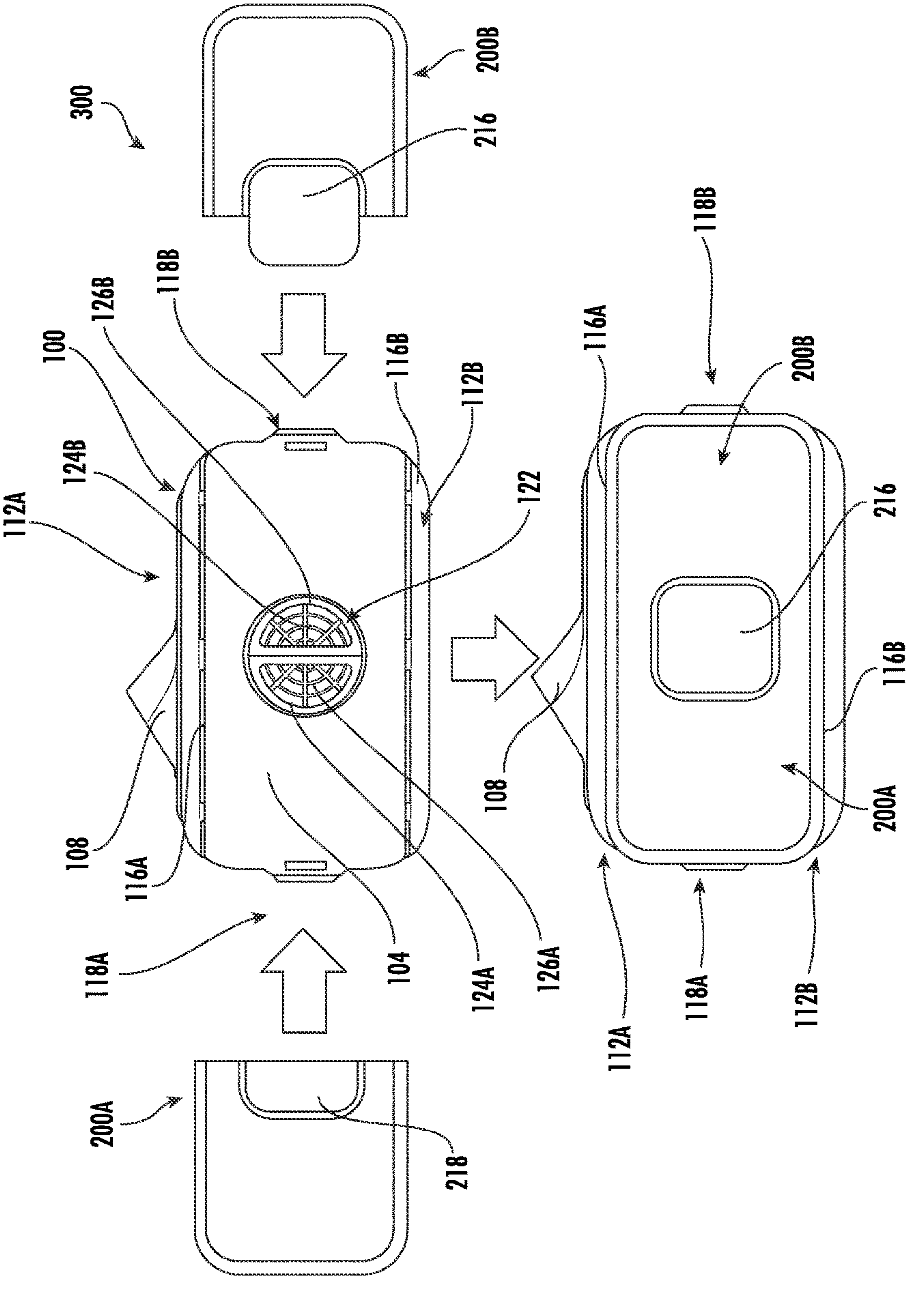
FIG. 7 is a top view of an example respirator system illustrating the installation of example filter cartridges into an example blower device in accordance with various embodiments of the present disclosure.

In some embodiments, in further reference to FIG. 5, the cartridge 200 may include a sealing surface 212 that is connected to or integrated with the blower-device engagement surface 206 of the cartridge 200. In some embodiments, the sealing surface 212 of the cartridge 200 provides a seal between the cartridge 200 and at least a portion of the air inlet 122. In some embodiments, an elastomeric material substantially in the shape of the sealing surface 212 may be placed on the sealing surface 212 (e.g., via adhesive) to further ensure a secure seal between the sealing surface 212 and at least a portion of the air inlet 122. In some embodiments, the cartridge 200 may include an outlet opening 214. In some embodiments, the outlet opening 214 may be configured to be aligned with at least a portion of the air inlet 122 of the blower device 100 and surrounded by the sealing surface 212. In some embodiments, when the air inlet 122 of the blower device 100 and the outlet opening 214 of the cartridge 200 are aligned, the cartridge 200 may be said to be in a first installed position. In some embodiments, when the cartridge 200 is in the first installed position, the stopper structures 118A, 118B slide into engagement with the groove 208 of the respective cartridges. The sealing surface 212 and outlet opening 214 may be positioned at or proximate one end of the blower-device engaging surface (e.g., as shown in FIG. 5) to engage the portion of the inlet 122 without obstructing a second cartridge from engaging another portion of the same inlet (e.g., as shown in FIG. 7). The sealing surface 212 and outlet opening 214 may be disposed at an oblique angle to the blower-device sealing surface. In some embodiments, there may be a second cartridge 200 installed on the blower device 100; in various embodiments, an outlet opening 214 of the second cartridge 200 may be aligned over at least a portion of the air inlet 122 of the blower device 200; in further embodiments, the second cartridge 200 may then be said to be in a second installed position. As depicted in FIG. 7, the respective cartridges may be slid into engagement with the blower device in different directions. It will be understood that additional cartridges 200 may be installed in additional installed positions on the blower device 100. In some embodiments, the sealing beam 128 may be configured to engage the filter cartridge 200 in the first installed position and the second filter cartridge 200 in the second installed position. In some embodiments, the sealing beam 128 may define each of the angles of the respective portions of the inlet 122 on either side of the midpoint.

In some embodiments, as shown in at least FIG. 5, the outlet opening 214 of the cartridge 200 may be disposed at one end of the blower-device engagement surface 206 of the cartridge 200. In other embodiments, the outlet opening 214 may be disposed proximate one end of the blower-device engagement surface 206. In some embodiments, the sealing surface 212 may be disposed at a complementary angle to the first inlet angle in the first installed position. In some embodiments, the cartridge 200 may include one or more sliding tracks 220A, 220B. In some embodiments, the one or more sliding tracks 220A, 220B may be configured to slidably engage the one or more projections 114A-114F disposed along the one or more lateral surfaces 116A, 116B. It will be understood that, in some embodiments, the one or more sliding tracks 220A, 220B may be disposed on the blower device 100 and in some embodiments the one or more projections 114A-114F may be disposed on the cartridge 200. As previously discussed with respect to the blower-device engagement surface 206 of the cartridge 200, the surface 206 may be curved and complementary to the top portion 104 of the blower device. In some embodiments, the sliding tracks 220A, 220B may be similarly curved with respect to the blower-device engagement surface 206 and/or the top portion 104. In some embodiments, the curved surfaces and components may facilitate a slidable attachment between the one or more sliding tracks 220A, 220B and the projections 114A-114F of the blower device 100. As further depicted in FIGS. 5-6, the sliding tracks 220A, 220B may further include a gap 230 along the lower edge of the track to allow the protrusions to be vertically inserted therein. This may expedite assembly by allowing the cartridges to be engaged without sliding the full width of the housing.

FIG. 6 is an angled view of an example cartridge 200 that can be used in accordance with various embodiments of the present disclosure. In some embodiments, a plurality of cartridges (e.g., two) 200 may be used as filter devices for the blower device 100, and each cartridge may be structured as shown in FIGS. 5-7. In some embodiments, two cartridges may have a mirrored structure with the respective engagement features reversed. In some embodiments, two distinct cartridges may be used. In some embodiments, two identical cartridges may be reversible and usable in both the first installed position and the second installed position. FIG. 7, for example, shows two example cartridges 200A, 200B being used with an example blower device 100 to form a respirator system 300. In the depicted embodiment, the two cartridges are identical except for a tab 216 that is included on the top surface of the rightmost cartridge and a recess in the top surface of the leftmost cartridge configured to receive the cover plate of the rightmost cartridge.

FIG. 7 is a top view of an example blower device 100 and cartridges 200 of a respirator system 300 illustrating the installation of example filter cartridges 200A, 200B into an example blower device 100 accordance with various embodiments of the present disclosure. In some embodiments, the assembly shown in FIG. 7 may be worn by a user for filtering air being supplied into a mask via a hose connected to the outlet 108. In some embodiments, and as shown in FIG. 7, the cartridge 200B may have a tab 216. In other embodiments, the cartridge 200A may have a slot 218 into which the tab 216 of another, mirrored cartridge 200 may be operably inserted.

According to some embodiments, FIG. 7 shows a cartridge 200A in a first installed position and a cartridge 200B in a second installed position. In some embodiments, the cartridges 200A, 200B are inserted into the blower device 100 simultaneously. In other embodiments, one cartridge 200A or 200B may be inserted before the other cartridge 200A or 200B or at any relative times. As indicated by the left and right facing arrows in FIG. 7, in some embodiments, the cartridges 200A, 200B may be slidably inserted in opposed directions. In some embodiments, the cartridges 200A, 200B may be inserted in series with each other; that is, one cartridge (e.g., 200A) may be first inserted in one direction to a first end of the blower device 100 (e.g., to the side on which the stopper device 118B is disposed) and then the second cartridge 200B may be inserted in the same direction and operably connect to the side of the blower device 100 on which the stopper device 118A is disposed. In some embodiments, the sealing beam 128 may be configured to engage both the first and second filter cartridges 200A, 200B when the cartridges 200A, 200B are in their respective first and second installed positions to form a sealed connection between the outlet openings of each cartridge and the respective portions of the inlet 122 on either side of the beam 128. In some embodiments, the first and second installed positions may be mirrored, opposite positions on the blower device 100. In some embodiments, the first and second installed positions may be when the respective outlets of the cartridges 200A, 200B are aligned with respective halves of the air inlet 126, 126B. In some embodiments, the cartridges 200A, 200B may be aligned over a single, unhalved air inlet 122. In some embodiments, when the cartridges 200A, 200B are in the respective first and second installed positions, the cartridges 200A, 200B are fixedly attached to the blower device 100 and ready for the user to operate the blower device 100. In the respective installed positions, the two depicted cartridges 200A, 200B may abut each other.

FIG. 8 a front view of an example headgear 400 included with an example respirator system 300 in accordance with various embodiments of the present disclosure. In some embodiments, the headgear 400 may include a face shield 406. In some embodiments, the face shield 406 may be semi-transparent. In some embodiments, the headgear 400 may include a mantle 408. In some embodiments, the mantle 408 may form a sealed connection with the outer surface 402 of the headgear. In some embodiments, a user of the example headgear 400 may utilize the example respirator system 300 to receive filtered air by means of the one or more cartridges 200A, 200B used with the blower device 100 and connected to the headgear via one or more hoses.

Air Filter Cartridge Installation Method Examples

FIG. 9 is a flow diagram of an example method 500 for installing a filter cartridge (e.g., 200) that can be used in accordance with various embodiments of the present disclosure.

According to some embodiments, the method 500 may include a step 502 aligning a first outlet opening of a first filter device with at least a first portion of at least one air inlet of the blower device. In some embodiments, the method 500 may include a step 504 aligning a second outlet opening of a second filter cartridge with at least a second portion of the at least one air inlet of the blower device. In some embodiments, the aligning the first outlet opening of the first filter device with the at least the first portion of the at least one air inlet of the blower device includes operably engaging a first stopper structure disposed on a first side of the housing with the first filter cartridge. In some embodiments, aligning the second outlet opening of the second filter device with the at least the second portion of the at least one air inlet of the blower device includes operably engaging a second stopper structure disposed on a second side of the housing with the second filter cartridge. In some embodiments, the aligning the first outlet opening of the first filter device with the at least the first portion of the at least one air inlet of the blower device includes sliding the first filter cartridge along a first direction to engage a first mounting groove of the first filter cartridge with the first stopper structure. In other embodiments, the aligning the second outlet opening of the second filter cartridge with at least the second portion of the at least one air inlet of the blower device includes sliding the second filter cartridge along a second direction, opposing the first direction, to engage a second mounting groove of the second filter cartridge with the second stopper structure.

Methods (such as 500) described in this disclosure are made with reference to the systems, apparatuses, and components described with respect to FIGS. 1, 2, 3, 4, 5, 6, 7, and 8. However, it will be understood that these methods (e.g., 500) may be performed with respect to a variety suitable systems, devices, and components.

Many modifications and other aspects of the disclosure set forth herein will come to mind to one skilled in the art to which this disclosure pertains having the benefit of the teachings presented in the foregoing descriptions and the associated drawings. Therefore, it is to be understood that the disclosure is not to be limited to the specific aspects disclosed and that modifications and other aspects are intended to be included within the scope of the appended claims. Although specific terms are employed herein, they are used in a generic and descriptive sense only and not for purposes of limitation.

The invention claimed is:

1. A respirator system comprising:

a blower device, wherein the blower device comprises a housing defining at least one air inlet;

a first filter cartridge defining a first outlet opening, wherein the first filter cartridge is configured to slidingly engage the blower device to slide the first outlet opening across at least a first portion of the air inlet to align the first outlet opening with at least the first portion of the air inlet of the blower device in a first installed position; and a second filter cartridge defining a second outlet opening, wherein the second filter cartridge is configured to slidingly engage the blower device to slide the second outlet opening across at least a second portion of the air inlet to align the second outlet opening with at least the second portion of the air inlet of the blower device in a second installed position.

2. The respirator system of claim 1, the blower device further comprises a first stopper structure disposed on a first side of the housing and a second stopper structure disposed on a second side of the housing opposite the first side of the housing, wherein the first stopper structure is configured to operably engage the first filter cartridge to retain the first filter cartridge in the first installed position, and wherein the second stopper structure is configured to operably engage the second filter cartridge to retain the second filter cartridge in the second installed position.

3. The respirator system of claim 2, wherein the housing extends laterally between the first side and the second side and the first filter cartridge is configured to slide laterally along a first direction to engage the blower device, the first filter cartridge comprising a first mounting groove, wherein the first stopper structure is configured to slide into engagement with the first mounting groove when the first filter cartridge reaches the first installed position, and wherein the second filter cartridge is configured to slide laterally along a second direction to engage the blower device, the second filter cartridge comprising a second mounting groove, wherein second stopper structure is configured to slide into engagement with the second mounting groove when the second filter cartridge reaches the second installed position.

4. The respirator system of claim 1, wherein the at least one inlet of the blower device comprises an inlet, and wherein the first outlet opening of the first filter cartridge and the second outlet opening of the second filter cartridge are each configured to align with the inlet simultaneously.

5. The respirator system of claim 4, wherein the inlet is disposed at a lateral midpoint along the housing, wherein the first outlet opening of the first filter cartridge is disposed at a first end of a first blower-device engagement surface of the first filter cartridge, and wherein the second outlet opening of the second filter cartridge is disposed at a second end of a second blower-device engagement surface of the second filter cartridge.

6. The respirator system of claim 5, wherein the inlet defines a sealing surface comprising a first portion angled at a first inlet angle towards the first filter cartridge in the first installed position, the first inlet angle transverse with the first blower-device engagement surface and a second portion angled at a second inlet angle towards the second filter cartridge in the second installed position, the second inlet angle transverse with the second blower-device engagement surface, and wherein the first inlet angle is disposed transversely to the second inlet angle in an instance in which the first filter cartridge and the second filter cartridge are in the first and second installed positions, respectively.

7. The respirator system of claim 6, wherein the first outlet opening defines a first sealing surface configured to be disposed at a first complementary angle to the first inlet angle in the first installed position, and wherein the second outlet opening defines a second sealing surface configured to be disposed at a second complementary angle to the second inlet angle in the second installed position.

8. The respirator system of claim 5, wherein the housing comprises a sealing beam defined across the inlet and configured to engage both the first filter cartridge in the first installed position and the second filter cartridge in the second installed position.

9. The respirator system of claim 4, wherein the first filter cartridge is configured to slidingly engage the blower device by sliding in a first direction, and wherein the second filter cartridge is configured to engage the blower device by sliding in a second direction opposing the first direction.

10. The respirator system of claim 1, wherein the first filter cartridge is configured to contact the second filter cartridge in an instance in which the first filter cartridge is in the first installed position and the second filter cartridge is in the second installed position.

11. The respirator system of claim 1, wherein one of each of the first filter cartridge and the second filter cartridge or the blower device, comprises at least one projection; wherein an other of each of the first filter cartridge and the second filter cartridge or the blower device, comprises at least one sliding track; wherein the at least one projection is configured to engage one or more of the at least one sliding track to facilitate the sliding engagement of the first filter cartridge and the second filter cartridge with the blower device.

12. The respirator system of claim 1, wherein the blower device comprises a filter cartridge engagement surface, wherein the first filter cartridge and the second filter cartridge each comprise a blower device engagement surface, and wherein the blower device engagement surfaces are configured to contact the filter cartridge engagement surface in an instance in which the first filter cartridge is in the first installed position and the second filter cartridge is in the second installed position.

13. The respirator system of claim 12, wherein the filter cartridge engagement surface and the blower device engagement surfaces define complementary non-linear shapes.

14. The respirator system of claim 1, wherein the respirator system is a powered air purifying respirator system (PAPR).

15. The respirator system of claim 1, wherein the first filter cartridge further comprises one or more pieces of elastomeric material, the one or more pieces of elastomeric material being configured to seal against the housing of the blower device.

* * * * *